United States Patent [19]

Bertling

[11] Patent Number: 5,237,804
[45] Date of Patent: Aug. 24, 1993

[54] MACHINE FOR MOWING AND CHOPPING CORN AND SIMILAR STALK-LIKE HARVESTED CROPS

[75] Inventor: Alfred Bertling, Stadtlohn, Fed. Rep. of Germany

[73] Assignee: Maschinenfabrik Kemper GmbH, Stadtlohn, Fed. Rep. of Germany

[21] Appl. No.: 864,778

[22] Filed: Apr. 7, 1992

[30] Foreign Application Priority Data

Apr. 12, 1991 [DE] Fed. Rep. of Germany ....... 4111981

[51] Int. Cl.⁵ .......................................... A01D 45/02
[52] U.S. Cl. ........................................ 56/60; 56/157; 56/102
[58] Field of Search ............... 56/14.5, 14.6, 14.1, 56/60, 102, 157; 460/16, 114, 72

[56] References Cited

U.S. PATENT DOCUMENTS

| | | | |
|---|---|---|---|
| 4,087,953 | 5/1978 | Wilson et al. | 56/14.6 |
| 4,282,703 | 8/1981 | Wilson et al. | 460/16 X |
| 4,594,842 | 6/1986 | Wolters et al. | 56/60 X |
| 4,722,174 | 2/1988 | Landry et al. | 56/14.5 |
| 4,928,460 | 5/1990 | Bruer et al. | 56/14.6 |

Primary Examiner—Stephen J. Novosad
Attorney, Agent, or Firm—Jordan and Hamburg

[57] ABSTRACT

A machine for mowing and chopping corn and similar stalk-like harvested crops includes at least two drawing-in and mowing devices which rotate about vertical axes and which are disposed on either side of the vertical, longitudinal midplane of the machine ahead of a chaff blower and, in each case, form several cutting sites. Push-in rollers, which form an inlet gap for the harvested crops, run in a horizontal plane lying at a distance above the working plane of the drawing-in and mowing device and are disposed ahead of the chaff blower for the purpose of charging it with the cut harvested crops. In the region between the two drawing-in and mowing devices and the pushing-in rollers, which are adjacent to the drawing-in and mowing devices and which define the inlet gap, in each case a sloping conveyor drum, bridges the vertical distance between the working plane of the drawing-in and mowing devices and the inlet gap plane and takes over the harvested crop from the drawing-in and mowing devices and feeds it to the inlet gap.

20 Claims, 6 Drawing Sheets

MACHINE FOR MOWING AND CHOPPING CORN AND SIMILAR STALK-LIKE HARVESTED CROPS

FIELD OF THE INVENTION

The invention relates to a machine for mowing and chopping corn and similar stalk-like harvested crops. Such machines are frequently also referred to as corn forage harvesters.

BACKGROUND OF THE INVENTION

In the case of a known such machine (European patent 0 099 527), which draws and mows in the stalks of the harvested crops in an upright position and subsequently supplies them to the chaff blower, upstream of which there are push-in rollers, a mode of operation, which is independent of the distance between the rows and of the direction of the rows of the harvested crops, is achieved by the plurality of the drawing and cutting sites, which are formed so as to be distributed over the front working region of the machine, so that the machine can be used like a combine harvester in grain, even in the case of broadcast sowing. Moreover, even bent or buckled harvested crops, such as corn flattened by wind and rain, can be picked up satisfactorily by the known machine with the help of the drawing teeth provided at the drawing-in and mowing devices.

Under operating conditions, however, it has been observed that, depending on the harvested crops, difficulties can arise with the known machines during the transport of the cut harvested crops from the outer drawing-in and mowing devices over the inner drawing-in and mowing devices, which act as transferring organ, to the push-in rollers of the chaff blower for the bunched feeding of the harvested crops into the inlet gap of the push-in rollers. These difficulties are attributable primarily to the fact that the working plane of the drawing-in and mowing devices and the plane containing the inlet gap of the push-in rollers of the chaff blower are disposed in different horizontal levels, between which there is a vertical distance.

SUMMARY OF THE INVENTION

It is therefore an object of the invention to provide a machine for mowing and chopping corn and similar stalk-like harvested crops, in which any stalk-like harvest crop can be fed reliably and rapidly into the inlet gap of the push-in rollers of the chaff blower in bunched or combined form.

By means of the sloping conveyor drums, which are provided in the inventive embodiment of the machine, the height difference between the working plane of the drawing-in and mowing devices and the horizontal plane, which is occupied by the inlet gap of the push-in rollers, is bridged in a simple manner, without disadvantageously affecting the working position of the drawing-in and mowing devices, which instead can work in an essentially horizontal plane with the desired plurality of drawing-in and cutting sites distributed over the front working region. At the same time, the cut harvested crop is reliably taken hold of by the sloping conveyor drums, which can have a smaller diameter than the drum-shaped drawing-in and mowing devices, and swiftly supplied to the inlet gap of the push-in rollers, in order to be comminuted then directly by the chaff blower. This makes it possible to work precisely with a high operating speed and comparatively short conveying paths for the cut harvested crops.

At the same time, the inventive machine can be equipped basically with only two drawing-in and mowing devices for mowing the harvested crop, particularly corn, which devices are disposed on either side of the vertical, longitudinal midplane of the machine, or, to achieve a greater working width of about 4.50 m, with four drawing-in and mowing devices in pairs on either side of the vertical, longitudinal midplane of the machine, the inner drawing-in and mowing devices, which adjoin the vertical, longitudinal midplane of the machine, at the same time in each case also forming, in a manner known per se, a transferring organ for the cut harvested crops supplied by the outer drawing-in and mowing devices.

A particularly preferred embodiment of an inventive machine has a working width of 4.50 m. This embodiment is distinguished by a particularly compact arrangement of the drawing-in and mowing devices and of the sloping conveyor drums in the axial direction of the machine, with which are connected short, straight, conveying paths of the cut harvested crops from the outer to the inner drawing-in and mowing devices and, from these, over the sloping conveyor drums to the push-in rollers of the chaff blower. With this construction, the center of gravity of the working tools lies closer to the front axle of the vehicle, so that the machine provides a better panoramic view for the driver and can be handled technically and ergonomically more advantageously.

In the following description, the invention is described in greater detail by means of a drawing, in which several embodiments of the objects of the invention are shown diagrammatically.

DESCRIPTION OF THE PREFERRED EMBODIMENTS

Figure 1:
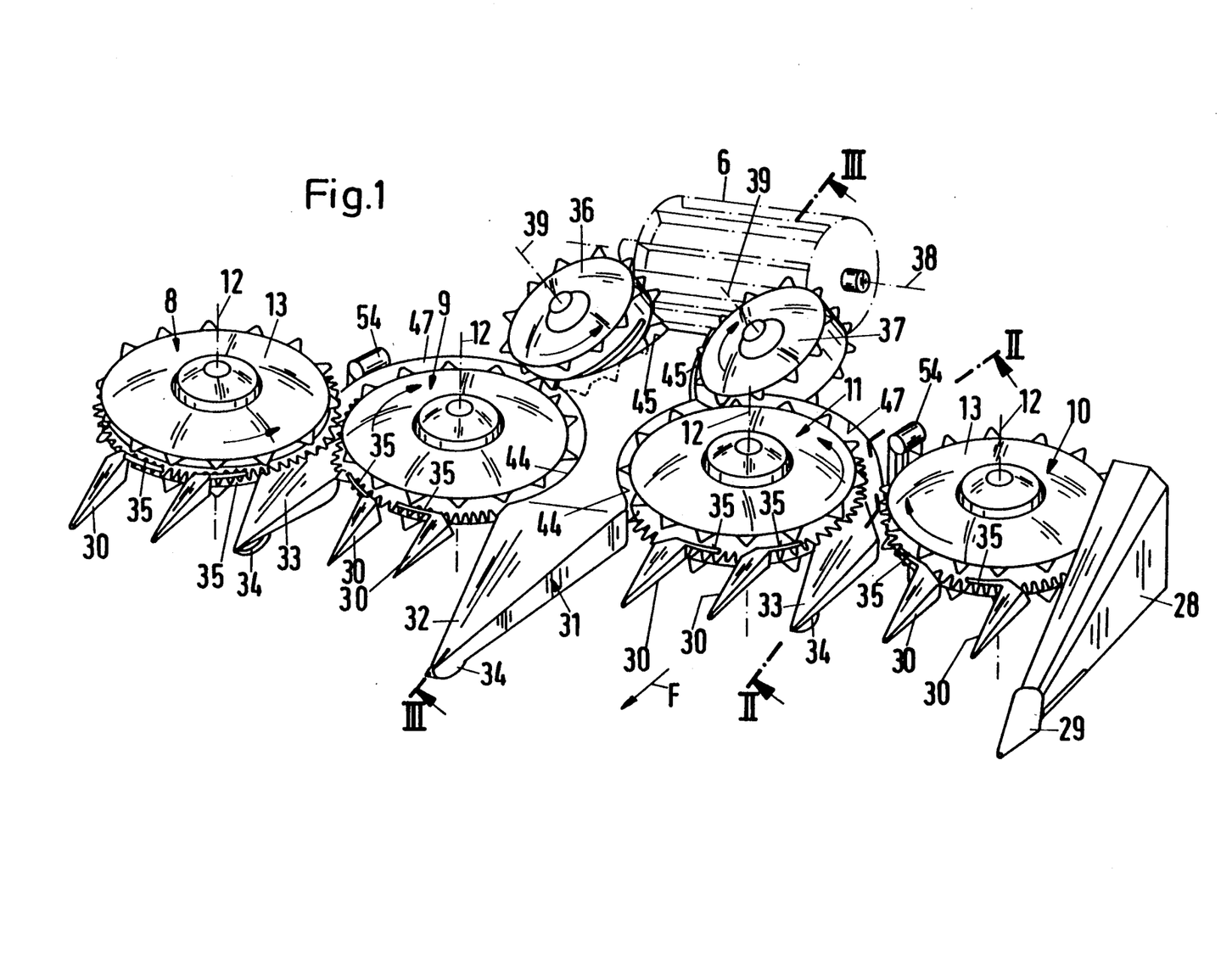
FIG. 1 shows a perspective view of the inventive machine of a first embodiment, the representation being limited essentially to the part of the machine comprising the four drawing-in and mowing devices.
Figure 2:
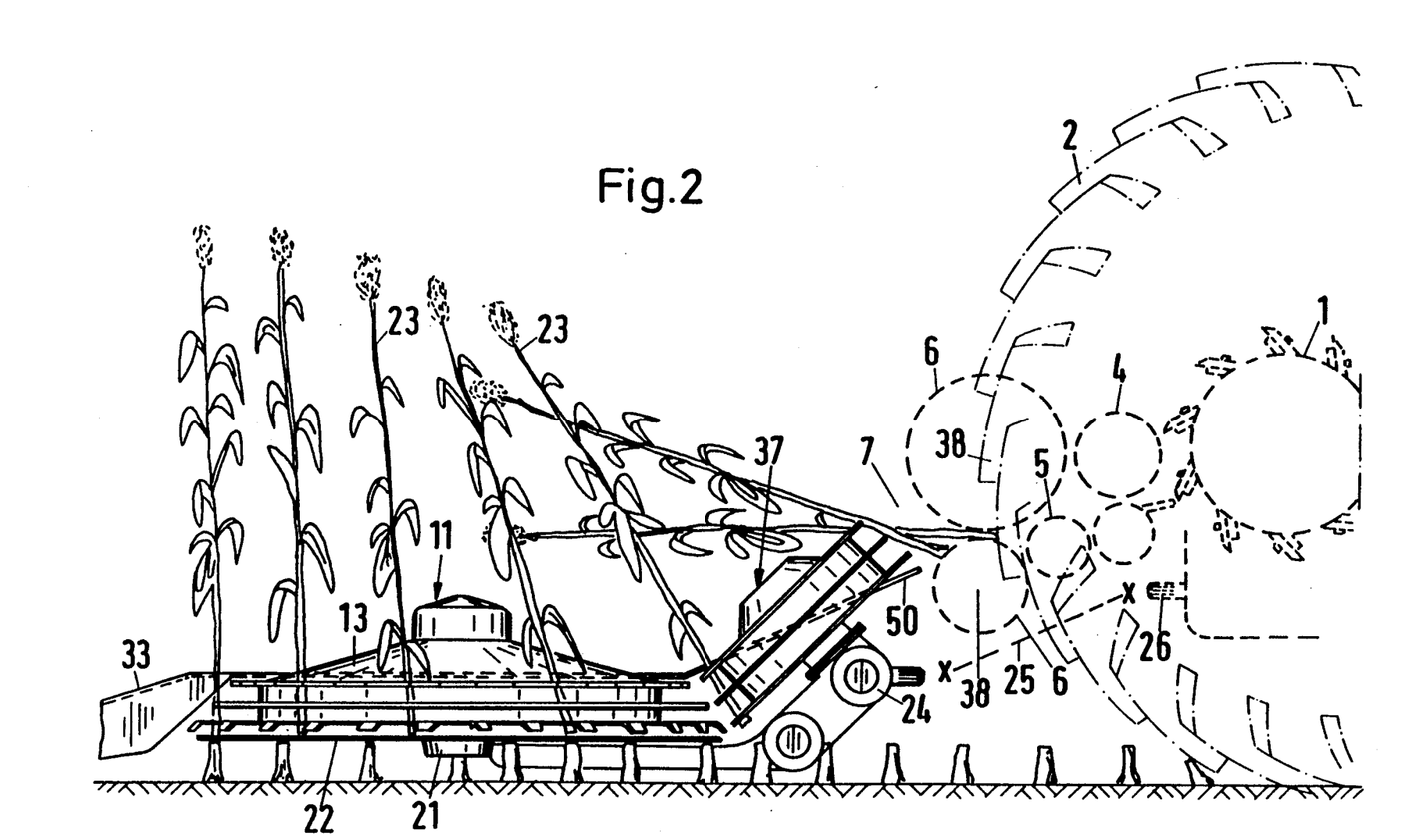
FIG. 2 shows a view of the machine along the line II—II of FIG. 1.

The machine of FIG. 1, which moves forward in the working or driving direction of arrow F, has a chaff blower 1, which is disposed transversely to the driving direction F and is shown by series of dashes and dots in FIG. 2, as is a tractor wheel 2 of an agricultural tractor or the like. The machine can be constructed as an attachment for a tractor as in the embodiment shown, or also as a self-propelled vehicle. Depending on the spatial relationships, several push-in rollers 4, 5 and 6 for the cut harvested crop can be disposed in front of the chaff blower 1. The push-in rollers 4 form a push-in roller pair immediately adjoining the chaff blower 1, while the push-in rollers 6 form a front push-in roller pair, which defines an inlet gap 7 for the cut harvested crop. A push-in roller 5 forms a lower, intermediate roller between the push-in roller pairs 4 and 6. The harvested crop supplied passes through the inlet gap 7 into the housing of the chaff blower 1, the details of which are not shown and in which it is comminuted and optionally blown out in the upwards direction by way of a tangential ejection duct.

To charge the chaff blower 1 with harvested crop, such as corn, four drawing-in and mowing devices 8, 9, 10 and 11 are disposed ahead of the chaff blower 1 (in the driving direction F) with adjacent, individual working widths formed by several cutting sites distributed over the front working region. The inner drawing-in and mowing devices 9 and 11, adjoining the vertical, longitudinal midplane of the machine that is characterized by the line of intersection III—III in FIG. 1, in each case also form at the same time a transfer organ for cut harvested crops supplied by the outer drawing-in and mowing devices 8, 10.

Figure 3:
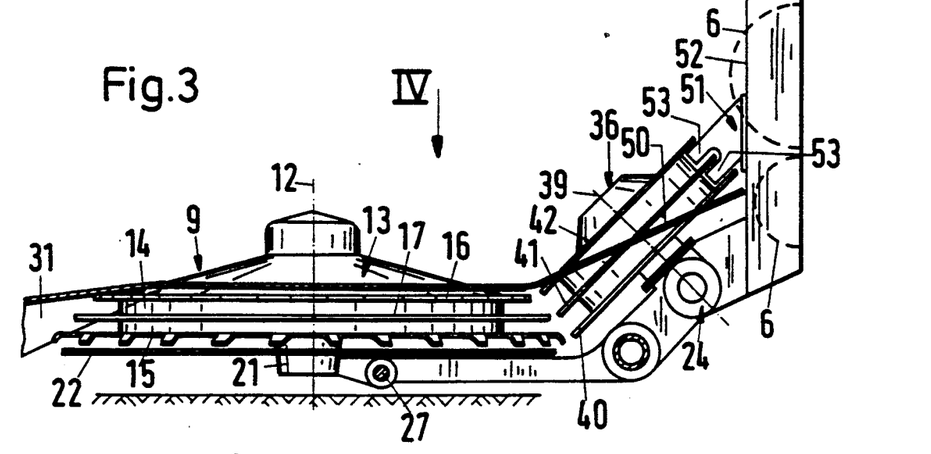
FIG. 3 shows a section through the vertical, longitudinal midplane of the machine along the line III—III of FIG. 1.
Figure 4:
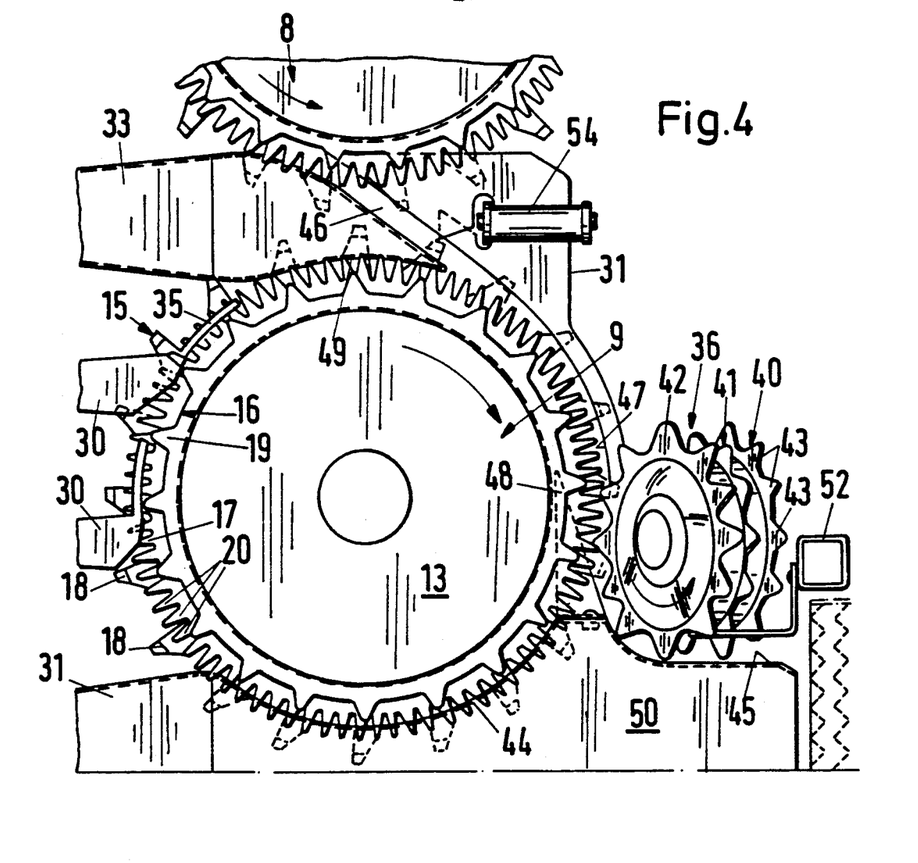
FIG. 4 shows a partial plan view of the machine in accordance with the arrow IV of FIG. 3.

Each of the drawing-in and mowing devices 8 to 11 consists of a rotating body 13, which rotates about a vertical or, at least, essentially vertical axis 12, and is in the form of a closed hollow body with a cylindrical outer case 14. At its outer circumference, the cylindrical case 14 is provided at its lower end with a driving toothed border 15, at its upper end with a driving toothed border 16 and, in the region between these, with a median driving toothed border 17. The individual teeth 18, 19, 20 of the driving toothed borders 15 to 17 can have any suitable form and arrangement, which may depend on the nature of the harvested crop, and have, for example, the construction, which can be seen particularly in FIGS. 3 and 4 and in which the teeth 18 of the lower driving toothed border 15 have end parts, which are bent downwards, while the teeth 19 and 20 of the driving toothed borders 16 and 17 run continuously in a radial plane of the rotating body 13 and have, for example, the shape of the short, widely spaced triangles of the teeth 19 of the upper toothed border 16 or the shape of the slender, close together triangles of the teeth 20 of the median toothed border 17.

Below the lower driving toothed border 18, the rotating body 13 has a central bearing part 21 for its rotor shaft, which defines the axis of rotation 12. For its rotation about the vertical axis of rotation 12 of the rotating body 13, a mowing knife 22, which is finely toothed at its outer periphery, is supported at the rotating body 13 in a manner, the details of which are not shown. In the operating state of the machine, the mowing knives 22 run at a substantially higher peripheral speeds than do the rotating bodies 13, so that the stalks of the material 23 being harvested (FIG. 2) are severed shortly above the ground as if by the rotary mower by means of the free cutting action of the mowing knives. The mechanism for driving the rotating body 13 and the driving knives 22 with different rotational speeds is taken in a manner not shown in greater detail over an angular gear 24 and over a propeller shaft 25 or the like from an elevated shaft 26 of the chaff blower 1 and transferred to the individual aggregates. A connecting shaft 27 for all rotating bodies 13 of the drawing and mowing devices 8 to 11 is shown at 27. The mowing knives 22 undergrasp the cylinder case 14 of the rotating body 13 and protrude beyond this to the outside. In turn, however, they are overgrasped by the lower driving toothed border 15, which is disposed at a small distance above the mowing knife 22 and rotates in a parallel horizontal plane.

In principle, the drawing-in and mowing devices 8 to 11 can also be designed so that their mowing or cutting knives work together with counter knives rigidly attached to the machine. In this case, the mowing knives can have the same rotational speed as the rotating bodies 13, so that the driving toothed borders 15 to 17 and the mowing knife can be driven with the same speed.

The drawing-in and mowing devices 8 to 11 are surrounded at the sides and back by a machine frame, which is open at the front in the driving direction F and shown only partly in the drawing. For example, FIG. 1 shows a lateral guide 28, which, together with a corresponding guide on the opposite of the machine frame, determines the working width of the machine. The lateral guides 28 run out at the front into a dividing point 29, which acts as a leaf lifter for the harvested material and prepares the mowing cut. Within the working width of the machine, further dividing points 30 are assigned to each drawing-in and mowing device 8 to 11 and are fixed to the underside of the machine in a manner, the details of which are not shown. A guiding rig 31 for the cut harvested material forms a median dividing point 32 in the vertical, longitudinal midplane of the machine and two guiding rigs form lateral dividing points 33 in the region between the drawing-in and mowing devices 8 and 9 or 10 an 11. At their free, front ends, the dividing points 32 and 33 are provided on the underside with skids 34 for support at the front of the guiding rig 31, which otherwise is held at the machine frame.

Between the adjacent dividing points, a drawing-in and cutting site for the stalks 23 is formed in each case. At the upper edge of the dividing points 30, guiding fingers 35 are provided in the area of the outer circumference of the rotating body 13 of the drawing-in and mowing devices 8 to 11. The guiding fingers 35 extend from one side of the dividing points 30 and follow the circumference of the respective rotating body 13 in the direction of rotation of the respective drawing-in and mowing devices 8 to 11. This direction of rotation is symbolized by the movement arrows. The guiding fingers 35 see to it that the cut stalks 23 in each case are pressed into the base of the teeth of the driving toothed borders 15, 16 and 17 of the rotating body 13, held there and carried along by these, so that they pass through subsequent drawing-in and cutting sites separately from additional stalks coming along.

In the area between the two inner drawing-in and mowing devices 9, and the push-in rollers 6 of the chaff blower 1 adjoining these, a sloping conveyor drum 36, 37 is supported in each case by a supporting frame. The sloping conveyor drum 36, 37 bridges the vertical distance between the essentially horizontal working plane of the drawing-in and mowing devices 8 to 11 and the essentially horizontal plane, in which the inlet gap 7 of the push-in rollers 6 lies. The sloping conveyor drums 36, 37 are arranged symmetrically, in mirror image fashion, on either side of the vertical, longitudinal midplane of the machine. With appropriate dimensioning of their diameter, they are disposed, on the one hand, at the periphery of the drawing-in and mowing devices 9,11 and, on the other hand, at the periphery of the push-in rollers 6, which rotate about the horizontal axis 38, in order to take over the cut harvested crops from the inner drawing-in and mowing devices 9, 11 and to supply them to the inlet gap 7 of the push-in rollers 6.

The sloping conveyor drums 36, 37 are driven in a manner, the details of which are not shown, over the angular gear 24 with a peripheral speed corresponding to the peripheral speed of the rotating body 13 in the direction indicated by the motion arrows in the drawing. Their axes of rotation 39 are inclined to a vertical plane parallel to the vertical, longitudinal midplane of the machine at an acute angle of preferably about 20° to the working plane of the drawing-in and mowing devices 8 to 11.

The sloping conveyor drums 36, 37, like the rotating body 13 of the drawing-in and mowing devices 8 to 11, are formed by hollow bodies closed all around and are provided at the outer periphery of the cylindrical drum case with driving toothed borders 40, 41 and 42. The driving toothed borders 40 and 42 are disposed in the lower and upper edge planes respectively of the drum case, while the driving toothed border 41 is located centrally between the driving toothed borders 40 and 42 at the drum case. The teeth 43 of the driving toothed borders 40 to 42 have a suitable undulating or indented form, which is suitable for handling the cut, harvested crop.

The outside diameters of the driving toothed borders 40 to 42 are dimensioned so that, in the region of the closest approach of the sloping conveyor drum 36, 37 to the rotating body 13 of the inner drawing-in and mowing devices 9 or 11, they work together or mesh at close distance with the corresponding driving toothed borders 15 to 17 of the drawing-in and mowing devices 9, 11. For a reliable further transport, it may be advisable to provide a further driving toothed border with a diameter corresponding to that of the toothed border 15 above the toothed border 16 at the mowing devices 9, 11. In this connection, it may prove to be advantageous to reduce the outside diameters from the lower driving toothed border 15 of the inner drawing-in and mowing devices 9, 11 and/or the sloping conveyor drums 36, 37 to the upper driving toothed border 16 or 42 to correspond to the angle of inclination of the sloping conveyor drums 36, 37. For the embodiment shown, this measure is carried out at the inner drawing-in and mowing devices 9, 11, as well as the sloping conveyor drums 36, 37, so that the rotating body 13 and the sloping drums 36, 37, in the region of their cylindrical shell have driving toothed border with, in cross section, a trapezoidal enveloping contour, which diminishes in the upwards direction.

The guiding rig 31, assigned to the drawing-in and mowing devices 8 to 11 and the sloping conveyor drums 36, 37 in symmetrical, mirror-image construction on either side of the vertical, longitudinal midplane of the machine, has lateral recesses 44 and circumferential guides 45 for the sloping conveyor drums 36, 37. Moreover, tangential guides 46 are formed in the rear-side elongation of the dividing points 33 for the transfer of the harvested crops cut by the outer drawing-in and mowing devices 8, 10. An adjacent peripheral guide 47 encompasses the rotating body 13 of the inner drawing-in and mowing devices 9, 11 as far as close to the sloping conveyor drum 36, 37. A stripper 48, which starts out from the median region of the guide rig 31, guides the cut harvested crops into the guide 45 that is assigned to the sloping conveyor drum 36, 37. The peripheral guide of the inner drawing-in and mowing devices 9, 11, which act as a transfer organ, is completed by a peripheral guide section 49 in rear-sided elongation of the dividing point 33, so that only that region of the drawing-in and mowing devices 9, which runs ahead in the driving direction F and forms the drawing-in and cutting sites, is kept free form peripheral guides.

In other respects, the guide rig 31 is provided with a central end part 50, which reaches between the sloping conveyor drums 36,37. As can be seen particularly in FIGS. 2 and 3, this central end part 50 is guided up in such a way, that externally it adjoins the inlet gap 7 of the push-in rollers 6. Above the end part 50, close to the front-side end regions of each of the push-in rollers 6, a lateral stripper 51 is fastened to a holding post 52 of the machine frame. In its free end region, the stripper 51 works together with the driving toothed borders 40 to 42 of the sloping conveyor drum 36, 37. For this purpose, the respective stripper 51 has the construction shown in FIG. 3 with a median through-slot for the median driving toothed border 41 of the sloping conveyor drum 36, 37. End-side contacting parts 53 reach between the driving toothed borders 40, 41 and 41, 42, in order to strip off the harvested crop transported there.

When the machine is operating, the cut harvested crop is taken hold of by the driving toothed borders 15 to 17 of the drawing-in and mowing devices 8 to 11 in conjunction with the guides that have been provided. If the rotors 13 are driven appropriately in opposite directions, the cut material is transferred from the outer drawing-in and mowing devices 8 and 10 to the inner drawing-in and mowing devices 9 and 11, which in this respect act as transfer organ. From the inner drawing-in and mowing devices 9, 11, the harvested crop, which has been cut by all the drawing-in and mowing devices 8 to 11 that are disposed in a common vertical transverse plane of the machine, reaches the sloping conveyor drums 36, 37. In turn, these sloping conveyor drums 36, 37 take over the harvested crop and, with their given direction of rotation, convey it to the push-in rollers 6. With the help of the strippers 51, the harvested crop is loosened from the driven tooth engagement with the sloping conveyor drums 36, 37 and then directly reaches the inlet gap 7 of the push-in rollers 6. This can be seen particularly well in FIG. 2, which, moreover, shows that, on the whole, a uniform, essentially horizontal stubble field is produced by the drawing-in and mowing devices 8 to 11. The working width of the machine can be 4.5 m or more.

When shifting the machine between different places of use on public streets and roads, the largest width of the machine, which is determined by the working width, can be reduced because the two outer drawing-in and mowing devices 8, 10 are supported at the machine frame by means of a hinge 54, so that they can be swiveled from the horizontal working position shown into a vertical transporting position, in which they are tilted upwards through 90°. At the same time, the driving connections between the adjacent drawing-in and mowing devices 8, 9 or 10, 11 can be uncoupled for the transporting process in a manner, the details of which are not shown.

Figure 5:
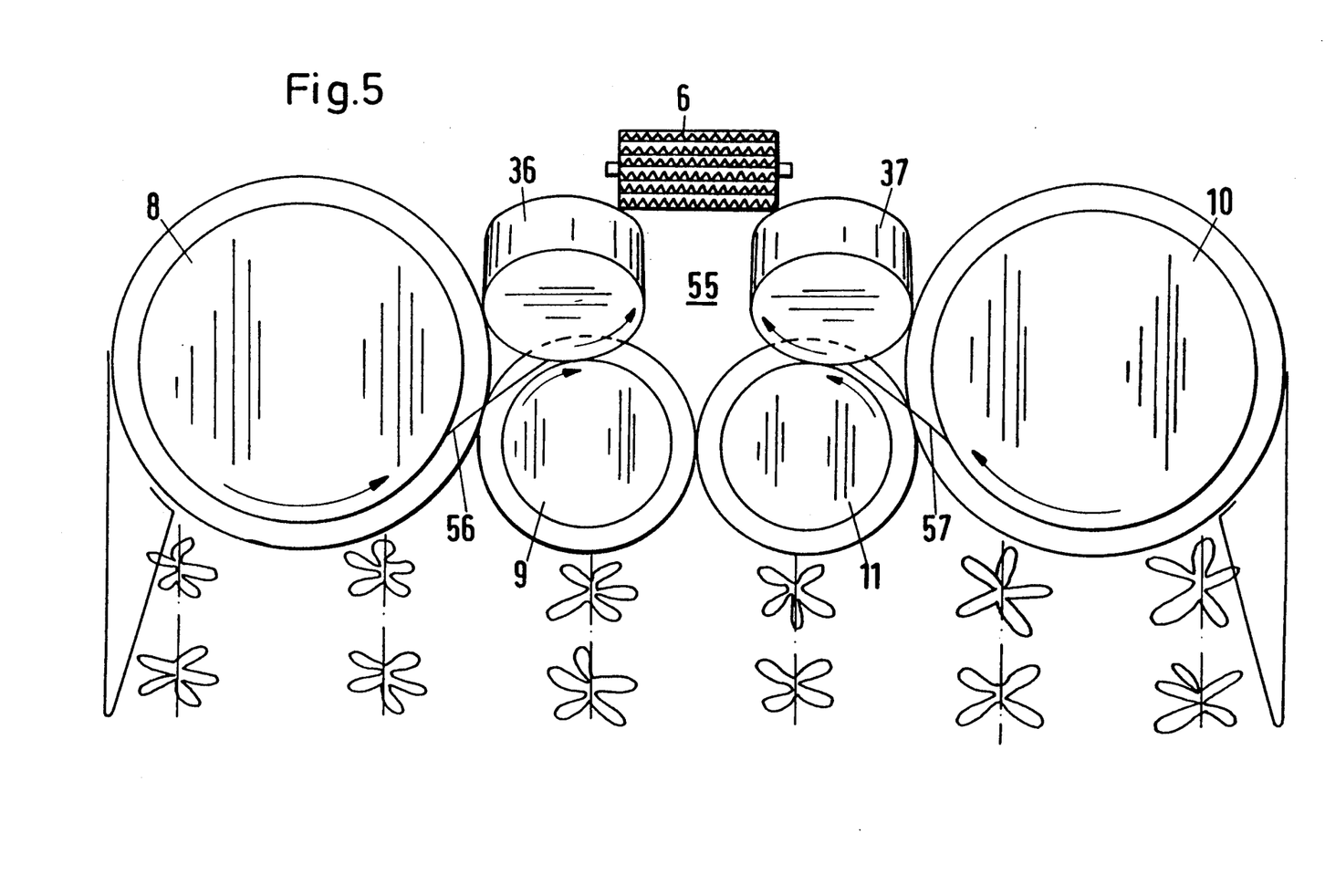
FIG. 5 shows a plan view of a further embodiment of the working part of the machine with four drawing-in and mowing devices.

For the modified embodiment of FIG. 5, the four drawing-in and mowing devices 8, 9, 10 and 11 are disposed, as in the case of the embodiment of FIG. 1, with their circumferential points, which protrude in the driving direction, disposed in a common, vertical transverse plane of the machine. In the present embodiment, however, not all of a the drawing-in and mowing devices 8 to 11 have the same diameter. Rather, the inner drawing-in and mowing devices 9 and 11 have a smaller diameter than the outer drawing-in and mowing devices 8 and 10. The ratio of the diameter of the inner drawing-in and mowing devices 9,11 to the diameter of the outer drawing-in and mowing devices 8, 10 can fall within the range of 1:1.5 to 1:2; in the example shown, it is about 1:1.75.

In this way, an accommodating space 55, in which the sloping conveyer drums 36 and 37, which are supported at the supporting frame, are accommodated, is formed between the two transverse planes of the machine, which are defined by the in driving direction lagging circumferential points of the outer and inner drawing-in and mowing devices 8 and 10 on the one hand and 9 and 11 on the other. The working part of the machine of this embodiment is therefore shorter in the axial direction than the working part of the machine of the embodiment of FIG. 1. Also associated with this are shorter, straight-line conveying paths for the cut harvested crop in the region between the outer drawing-in and mowing devices 8, 10 and the inner drawing-in and mowing devices 9,11, as specified by a straight-line stripper 56, 57 in each of the circumferential contract regions between the inner and the outer drawing-in and mowing devices 8, 9 and 10, 11. The cut harvested crop is conveyed centrally to the push-in rollers 6 by way of the medium conveying gap, which is left between the peripheries of the sloping conveyor drums 36 and 37.

Figure 6:
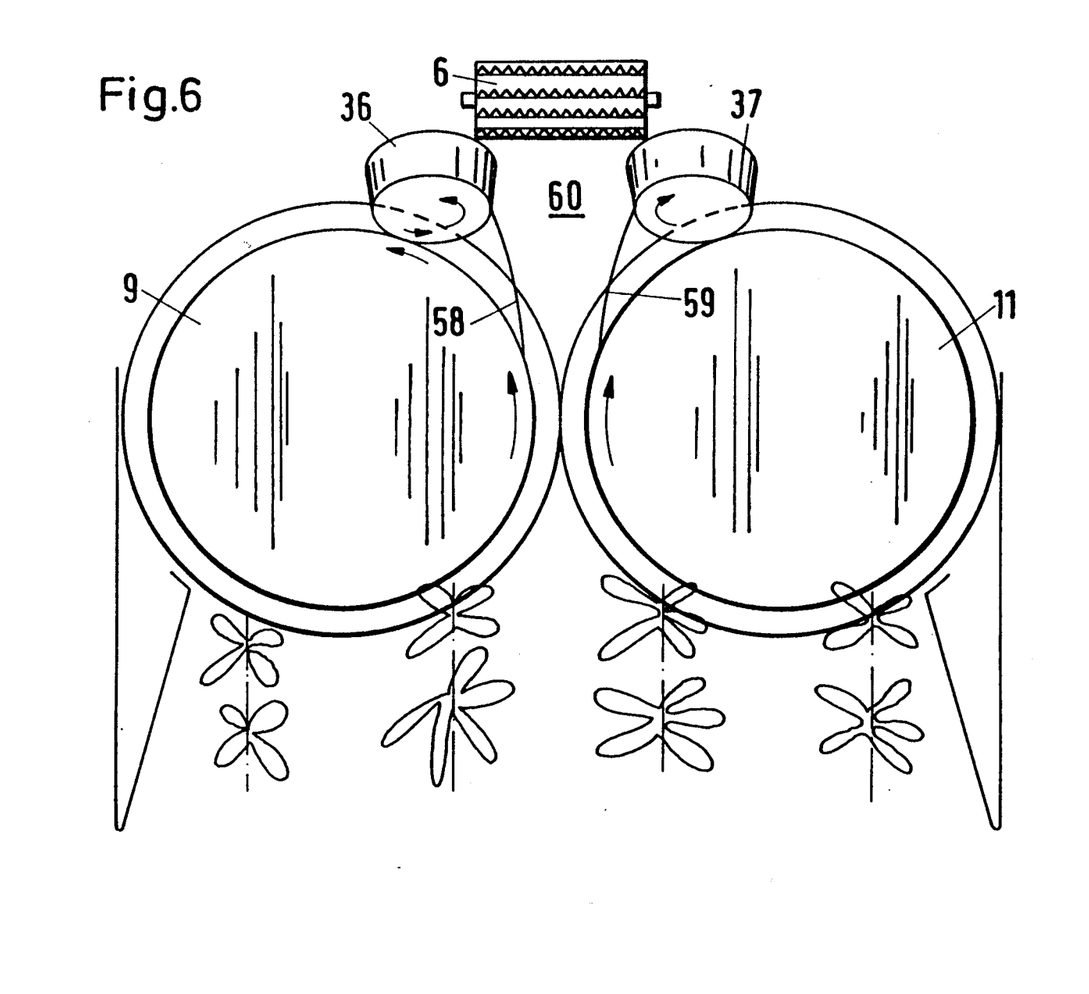
FIG. 6 shows a plan view of a further embodiment of the inventive machine, in which the working part comprises only two drawing-on and mowing devices.

FIG. 6 illustrates an embodiment of the machine, in which on either side of its vertical, longitudinal midplane in each case only one drawing-in and mowing devices 9 or 11 is disposed. This machine has a working width of about 3 m. The two sloping conveyor drums 36 and 37 of this embodiment, as in the case of the embodiment of FIG. 5, are assigned to the front-side end regions of the push-in rollers 6 of the chaff blower 1. Since their diameter is reduced appreciably compared to that of the drawing-in and mowing devices 9, 11, the sloping conveyor drums 36 and 37 are taken close to the gusset between the two drawing-in and mowing devices 9, 11 and, in conjunction with a stripper 58, 59 each, form the boundary of a median push-in duct 60 for the cut harvested crop. The strippers 58 and 59 run in a slightly arched fashion from the periphery of the drawing-in and mowing devices 9 or 11 to the adjoining sloping conveyor drum 36 or 37.

Figure 7:
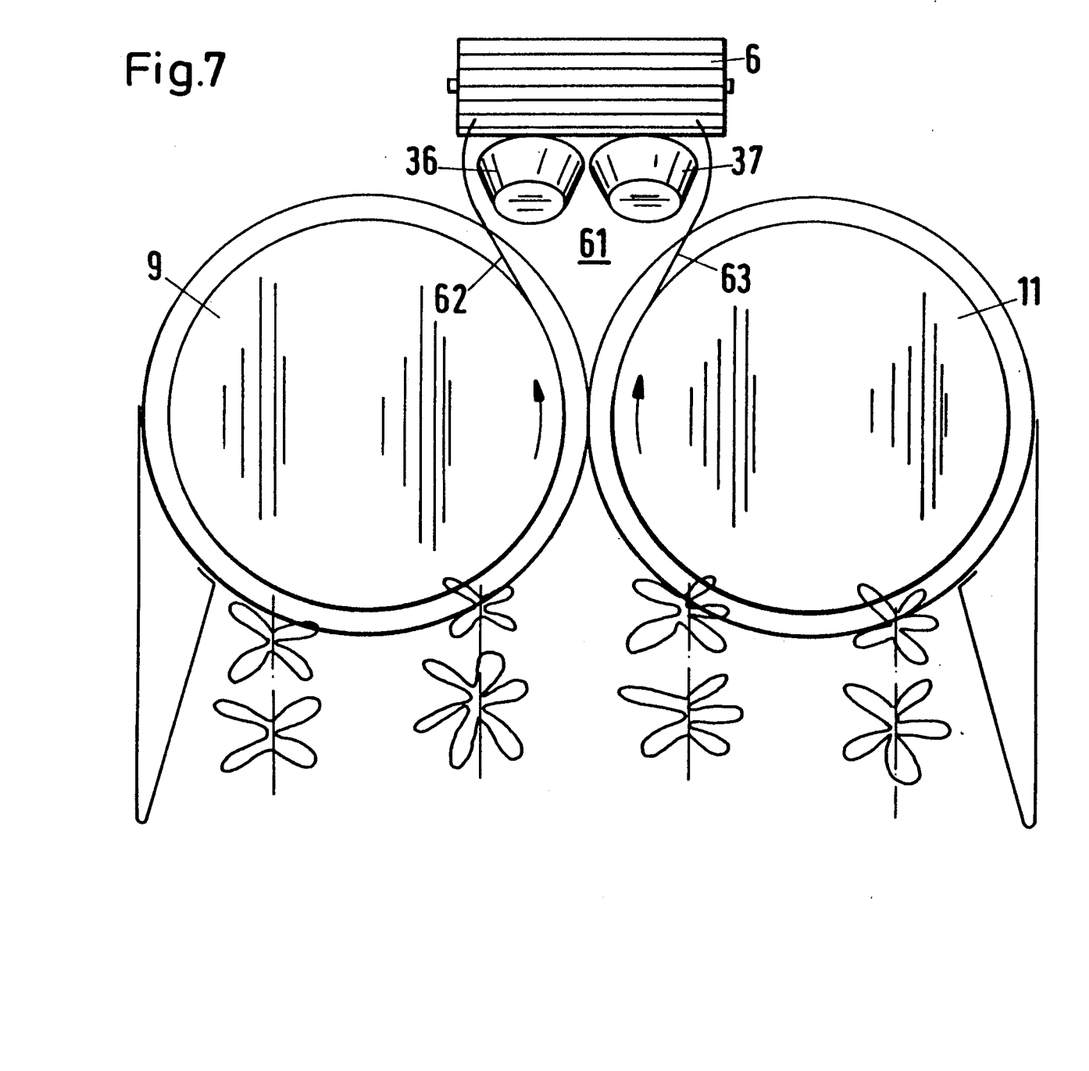
FIG. 7 shows a representation corresponding to FIG. 6 to illustrate a modification.

A modification of a machine with only two drawing-in and mowing devices 9, 11, disposed on either side of the vertical, longitudinal midplane, is illustrated in FIG. 7. According to this, the two sloping conveyor drums 36, 37 are disposed in a gusset space 61 formed between the two drawing-in and mowing devices 9, 11 and the push-in rollers 6. The two sloping conveyor drums 36 and 37 are mounted on the peripheral side ahead of the push-in rollers 6, while the gusset space 61 is bounded on the outside by two stripper and guiding metal sheets 62, 63 for the cut harvested crop. The two stripper and guiding metal sheets 62, 63 run from the periphery of the respective adjoining drawing-in and mowing device 9 or 11 with arched enclosure of the two sloping conveyor drums 36, 37 to the front-side end regions of the push-in rollers 6 of the chaff blower 1.

The cut harvested crop, which is transported centrally between the drawing-in and mowing devices 9 and 11 as in the case of the embodiment of FIG. 6, is supplied in the case of this embodiment over the outer conveying gap between the stripper and guiding metal sheets 62, 63 and the respectively adjoining periphery of the sloping conveyor drums 36, 37 to the push-in rollers 6 from direction of the two axial end regions of the push-in rollers 6. With this embodiment also, a compact, axially short construction is achieved for the sloping conveyor drums 36, 37, the diameters of which are reduced appreciably, for example, to about ¼ of the diameter of the drawing-in and mowing devices 9, 11.

For all the embodiments, the same reference symbols are used for the same or corresponding parts without being described again in detail.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What I claim is:

1. A machine movable and operable along a substantially horizontal ground surface for mowing and processing stalk-like crops comprising:
   mowing means for cutting said crop, said mowing means defining a substantially horizontal cutting plane substantially parallel to said ground surface, said mowing means comprising rotary cutting devices rotating about substantially vertical axes;
   processing means receiving and processing said cut crop;
   feed means upstream of said processing means for feeding said cut crop to said processing means, said feed means having an inlet passage which receives said cut crop;
   said inlet passage being spaced downstream from said mowing means and being disposed above said ground surface at an elevation higher than said cutting plane; and
   rotary conveyor means disposed between said mowing means and said inlet passage, said rotary conveyor means having rotary axes disposed at an acute angle relative to said substantially horizontal cutting plane, said rotary conveyor means conveying said cut crop downstream from said mowing means to said inlet passage while generally elevating said cut crop from said cutting plane to said elevated inlet passage.

2. A machine according to claim 1, wherein said processing means comprising chopping means for chopping said cut crop.

3. A machine according to claim 1 further comprising duct means disposed between said mowing means and said rotary conveyor means, said duct means having stripper parts for stripping said cut crop from said mowing means.

4. A machine movable along a ground surface for mowing and processing stalk-like crops comprising:
   mowing means for cutting said crop, said mowing means defining a cutting plane substantially parallel to said ground surface;
   processing means receiving and processing said cut crop;
   feed means upstream of said processing means for feeding said cut crop to said processing means, said feed means comprising opposed rollers rotatable about axes substantially parallel to said ground surface, said feed means having an inlet passage which receives said cut crop, said opposed rollers being spaced from one another to define said inlet passage;

said inlet passage being spaced downstream from said mowing means and being disposed above said ground surface at an elevation higher than said cutting plane; and rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage.

5. A machine movable along a ground surface for mowing and processing stalk-like crops comprising:

mowing means for cutting said crop, said mowing means defining a cutting plane substantially parallel to said ground surface, said mowing means comprising rotary cutting devices rotatable about axes generally perpendicular to said cutting plane and guide means upstream of said rotary cutting devices for guiding cut crop to said rotary cutting devices;

processing means receiving and processing said cut crop;

feed means upstream of said processing means for feeding said cut crop to said processing means, said feed means having an inlet passage which receives said cut crop;

said inlet passage being spaced downstream from said mowing means and being disposed above said ground surface at an elevation higher than said cutting plane; and rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage.

6. A machine movable along a ground surface for mowing and processing stalk-like crops and having a central longitudinal axis generally parallel to the direction of movement of the machine along said ground surface comprising:

mowing means for cutting said crop, said mowing means defining a cutting plane substantially parallel to said ground surface, said mowing means comprising at least two rotary cutting devices with at least one of said rotary cutting devices being disposed on one side of said longitudinal axis and at least one other of said rotary cutting devices being disposed on the other side of said longitudinal axis;

processing means receiving and processing said cut crop;

feed means upstream of said processing means for feeding said cut crop to said processing means, said feed means having an inlet passage which receives said cut crop;

said inlet passage being spaced downstream from said mowing means and being disposed above said ground surface at an elevation higher than said cutting plane; and rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage, said rotary conveyor means comprising two rotary conveying drums with one of said rotary conveying drums being disposed on one side of said longitudinal axis and the other rotary conveying drum being disposed on the other side of said longitudinal axis.

7. A machine according to claim 6, wherein said machine has an imaginary mid-plane which contains said longitudinal axis and which is generally perpendicular to said cutting plane, said rotary conveying drums having axes of rotation which are disposed in imaginary planes parallel to said imaginary mid-plane.

8. A machine according to claim 6, wherein said machine is movable in a forward direction over said ground surface, a first space provided between said two rotary cutting devices and a second space is provided between said two rotary conveying drums, and further comprising a guiding rig means extending from said first space to said second space, said guiding rig means having a forward portion extending upstream of said mowing means, said guiding rig means having a rear portion extending downstream of said mowing means through said second space and which is disposed at an acute angle relative to said cutting plane.

9. A machine according to claim 8, wherein said rear portion extends to said inlet passage of said feed means.

10. A machine according to claim 6, wherein said machine is movable in a forward direction over said ground surface, said mowing means comprising a first inner rotary cutting device and a first outer rotary cutting device on one side of said longitudinal axis, said mowing means further comprising a second inner rotary cutting device and a second outer rotary cutting device on the other side of said longitudinal axis, each of said first inner and said second outer rotary devices have a forward-facing outer peripheral part disposed in an imaginary forward transverse plane which is perpendicular to said longitudinal axis and which is perpendicular to said cutting plane.

11. A machine according to claim 10, wherein each of said first and second inner rotary devices have a diameter less than the diameter of said first and second outer rotary devices, each of said first and second inner rotary devices having a rear-facing outer peripheral part disposed in an imaginary first rear transverse plane, each of said first and second outer rotary devices having a rear-facing outer peripheral part disposed in an imaginary second rear transverse plane, said first and second rear transverse planes being parallel to said forward transverse plane, said first and second rear transverse planes being spaced from one another to define an accommodating space between said first and second rear transverse planes, said rotary conveying drums being disposed in said accommodating space.

12. A machine according to claim 10, wherein each of said first and second inner rotary devices have the same diameter which is designated a first diameter, each of said first and second outer rotary devices having the same diameter which is designated a second diameter, said first diameter being less than said second diameter.

13. A machine according to claim 12, wherein the ratio of said first diameter to said second diameter is within the range of from 1:1.5 to 1:2.

14. A machine according to claim 12 further comprising a first linear stripper means disposed between said first inner rotary device and said first outer rotary device, and a second linear stripper means disposed between said second inner rotary device and said second outer rotary device.

15. A machine movable along a ground surface for mowing and processing stalk-like crops comprising:
 mowing means for cutting said crop, said mowing means defining a cutting plane substantially parallel to said ground surface;
 processing means receiving and processing said cut crop;
 feed means upstream of said processing means for feeding said cut crop to said processing means, said feed means having an inlet passage which receives said cut crop;
 said inlet passage being spaced downstream from said mowing means and being disposed above said ground surface at an elevation higher than said cutting plane; and
 rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage, said rotary conveyor means comprising rotary drums having an outer periphery provided with circumferentially spaced conveying teeth for engaging and conveying said cut crop.

16. A machine according to claim 15, wherein said mowing means comprise at least one rotary element having an outer peripheral portion with circumferentially spaced teeth for engaging and conveying said cut crop to said conveying teeth of said rotary conveying drums.

17. A machine movable along a ground surface for mowing and processing stalk-like crops comprising:
 mowing means for cutting said crop, said mowing means defining a cutting plane substantially parallel to said ground surface;
 processing means receiving and processing said cut crop;
 feed means upstream of said processing means for feeding said cut crop to said processing means, said feed means having an inlet passage which receives said cut crop;
 said inlet passage being spaced downstream from said mowing means and being disposed above said ground surface at an elevation higher than said cutting plane; and
 rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage, said rotary conveyor means comprising a plurality of rotary elements each having an outer periphery with conveying teeth for engaging said conveying said cut crop.

18. A machine movable along a ground surface for mowing and processing stalk-like crops comprising:
 mowing means for cutting said crop, said mowing means defining a cutting plane substantially parallel to said ground surface, said mowing means comprising a plurality of rotary elements rotatable about a common rotary axis, each of said rotary elements having an outer periphery with a different outer peripheral diameter such that the outer peripheries of said plurality of rotary cutting elements lie along a sloping line disposed in an imaginary diametrical plane which contains said common axis, said sloping line being disposed at an angle relative to said cutting plane which is substantially equal to said acute angle;
 processing means receiving and processing said cut crop;
 feed means upstream of said processing means for feeding said cut crop to said processing means, said feed means having an inlet passage which receives said cut crop;
 said inlet passage being spaced downstream from said mowing means and being disposed above said ground surface at an elevation higher than said cutting plane; and
 rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage.

19. A machine movable along a ground surface for mowing and processing stalk-like crops comprising:
 mowing means for cutting said crop, said mowing means defining a cutting plane substantially parallel to said ground surface;
 processing means receiving and processing said cut crop;
 feed means upstream of said processing means for feeding said cut crop to said processing means, said feed means having an inlet passage which receives said cut crop;
 said inlet passage being spaced downstream from said mowing means and being disposed above said ground surface at an elevation higher than said cutting plane;
 rotary conveyor means disposed between said mowing means and said inlet passage, said rotary conveyor means having a rotary axis disposed at an acute angle relative to said cutting plane, said rotary conveyor means conveying said cut crop downstream from said mowing means to said inlet passage while generally elevating said cut crop from said cutting plane to said elevated inlet passage; and
 spaced guide plate means extending between said mowing means and said rotary conveyor means, a gusset space between said two spaced guide plate means, said rotary conveyor means being disposed in said gusset space between said two spaced guide plate means, said two spaced guide plate means having stripper parts for stripping said cut crop from said mowing means.

20. A machine according to claim 19, wherein said mowing means comprise at least two rotary cutting devices each having an outer periphery, said guide plate means extending from said outer periphery of said rotary cutting devices, said guide plate means extending about a portion of the outer periphery of said rotary conveyor means, said feed means comprising push-in rollers, said guide plate means extending to a position juxtaposed to said push-in rollers.

* * * * *